(12) United States Patent
Rönneke et al.

(10) Patent No.: US 8,554,216 B2
(45) Date of Patent: Oct. 8, 2013

(54) DEVICES FOR CONGESTION CONTROL (75) Inventors: Hans Rönneke, Kungsbacka (SE);
Rikard Eriksson, Jörlanda (SE);
Magnus Olsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/981,666

(22) Filed: Dec. 30, 2010

(65) Prior Publication Data

US 2011/0269473 A1  Nov. 3, 2011

Related U.S. Application Data (60) Provisional application No. 61/329,774, filed on Apr. 30, 2010, provisional application No. 61/329,645, filed on Apr. 30, 2010.

(51) Int. Cl.
*H04W 4/00* (2009.01)

(52) U.S. Cl.
USPC ........ 455/435.1; 455/411; 455/434; 455/455; 370/230.1

(58) Field of Classification Search
USPC ...................................... 455/435.1
See application file for complete search history.

(56) References Cited

U.S. PATENT DOCUMENTS

| 6,295,284 | B1 * | 9/2001 | Maggenti | 370/328 |
|---|---|---|---|---|
| 2002/0110123 | A1 * | 8/2002 | Shitama | 370/389 |
| 2006/0126547 | A1 | 6/2006 | Puuskari et al. | |
| 2009/0213775 | A1 * | 8/2009 | Rey et al. | 370/312 |
| 2010/0070817 | A1 | 3/2010 | Heise | |
| 2010/0157959 | A1 | 6/2010 | Hiben et al. | |
| 2010/0226252 | A1 | 9/2010 | Gogic et al. | |
| 2011/0098020 | A1 * | 4/2011 | Van Loon et al. | 455/411 |
| 2011/0199901 | A1 * | 8/2011 | Kavanaugh et al. | 370/230.1 |
| 2011/0199905 | A1 | 8/2011 | Pinheiro et al. | |
| 2011/0274040 | A1 | 11/2011 | Pani et al. | |
| 2011/0292893 | A1 | 12/2011 | Lee et al. | |
| 2012/0033613 | A1 | 2/2012 | Lin et al. | |
| 2012/0039171 | A1 | 2/2012 | Yamada et al. | |

OTHER PUBLICATIONS

Notification of Transmittal of International Search Report and Written Opinion for International Application No. PCT/EP2010/070913 mailed Mar. 31, 2011.
LTE, Evolved Universal Terrestrial Radio Access (E-UTRA); Radio Resource Control (RRC); Protocol Specification (3GPP TS 136.331 version 8.9.0 Release 8); Apr. 1, 2010, XP014046912.

(Continued)

*Primary Examiner* — Charles Appiah
*Assistant Examiner* — Mazda Sabouri
(74) *Attorney, Agent, or Firm* — Nixon & Vanderhye P.C.

(57) ABSTRACT

The embodiments herein relate to a method in a transceiver (110) for permitting access to a cellular communications system (100). The transceiver (110) is configured to transmit traffic to a communication node (101,120). The transceiver (110) receives a permission message from the communication node (101,120). The permission message indicates permission to a group of transceivers to transmit an access request message indicating a request to transmit the traffic to the communication node (101, 120). The transceiver (110) determines whether the transceiver (110) is comprised in the group of transceivers having permission to transmit the access request message based on the received permission message.

14 Claims, 7 Drawing Sheets

(56) References Cited

OTHER PUBLICATIONS

3rd Generation Partnership Project; Technical Specification Group Services and System Aspects; Service Requirements for Machine-Type Communications (MTC); Stage 1 (Release 10); 3GPP TS 22.368 V10.0.0; Mar. 1, 2010, XP007917753.

3rd Generation Partnership Project; Technical Specification Group Services and System Aspects; System Improvements for Machine-Type Communications, (Release 10); 3GPP TR 23.888V0.3.2; Mar. 1, 2010, XP007917755.

3rd Generation Partnership Project; Technical Specification Group Services and System Aspects; General Packet Radio Service (GPRS) Enhancement for Evolved Universal Terrestrial Radio Access Network (E-UTRAN) access (Release 10), 3GPP TS 23.401 V10.2.0, Dec. 1, 2010, XP007917754.

U.S. Appl. No. 12/981,725, filed Dec. 30, 2010; Inventor: Ronneke et al.

U.S. Appl. No. 12/981,686, filed Dec. 30, 2010; Inventor: Stackelius et al.

Office Action mailed Jun. 18, 2012 in co-pending U.S. Appl. No. 12/981,686.

Written Opinion mailed May 15, 2012 in corresponding Application No. PCT/EP2010/070913.

3GPP TR 23.898 V7.0.0, Technical Report "3rd Generation Partnership Project; Technical Specification Group Services and System Aspects; Access Class Barring and Overload Protection; (Release 7)", Mar. 2005; XP002473887.

Office Action mailed Jan. 31, 2013 in U.S. Appl. No. 12/981,725, pp. 1-27.

Office Action mailed Nov. 13, 2012 in U.S. Appl. No. 12/981,686.

\* cited by examiner

DEVICES FOR CONGESTION CONTROL

CROSS-REFERENCE

This application claims the benefit of Provisional Application No. 61/329,774 filed Apr. 30, 2010 and Provisional Application No. 61/329,645 filed Apr. 30, 2010, the entire contents of which are hereby incorporated by reference herein.

BACKGROUND

In a typical cellular system, wireless terminals, also known as mobile stations and/or User Equipment units (UEs) communicate via Radio Access Networks (RAN) to a Core Network (CN). The wireless terminals may be mobile stations or user equipments such as mobile telephones also known as cellular telephones, and laptops with wireless capability, and thus may be, for example, portable, pocket, hand-held, computer-included, or car-mounted mobile devices which communicate voice and/or data with radio access network. The wireless terminals may also be communication devices or modules that are part of other electronic equipments such as video or photographic camera equipment, electronic photo frames, cardiac surveillance equipment, intrusion or other surveillance equipment, weather data monitoring systems, car or transport communication equipment, etc.

The radio access network is the network that is located between the wireless terminals, and the core network. RAN provides radio bearers between the core network and the wireless terminals for the transport of data and signaling, thus enabling wireless terminals to access services offered e.g. by Internet. The main RAN function comprises establishment, maintenance, and termination of radio channels; radio resource management; and mobility management. The radio access network covers a geographical area which is divided into cell areas, with each cell area being served by a base station, e.g. a Radio Base Station (RBS), which in some radio access networks is also called evolved NodeB (eNB), NodeB, B node or base station. A cell is a geographical area where radio coverage is provided by the radio base station at a base station site. Each cell is identified by an identity within the local radio area, which is broadcast in the cell. The base stations communicate over the air interface operating on radio frequencies with the user equipments within range of the base stations.

In some versions of the radio access network, several base stations are typically connected, e.g. by landlines or microwave, to a Radio Network Controller (RNC), as in $3^{rd}$ Generation (3G), i.e. Wideband Code Division Multiple Access (WCDMA). The radio network controller supervises and coordinates various activities of the plural base stations connected thereto. In $2^{nd}$ Generation (2G), i.e. Global System for Mobile communication (GSM), the base stations are connected to a Base Station Controller (BSC). The network controllers are typically connected to one or more core networks.

Machine-to-Machine (M2M) is a term referring to technologies that allow both wireless and wired systems to communicate with other devices of the same ability, for example computers, embedded processors, smart sensors, actuators and mobile devices may communicate with one another, take measurements and make decisions, often without human intervention The Machine to Machine traffic, "M2M" traffic, is becoming increasingly common in cellular wireless communication systems, such as GSM, WCDMA and LTE. M2M traffic is, for example, used in such diverse applications as electricity meters, home alarms, signaling from vehicles, such as e.g. cars, trucks etc.

So called Machine Type Communication (MTC), is becoming increasingly frequent in cellular communications system of, for example, such types as GSM, WCDMA and Long Term Evolution (LTE). MTC entails signaling "between machines", e.g. readings from electricity meters to a central and other such traffic.

Since MTC offers automation possibilities for many areas of technology, an increase in traffic can also be foreseen, which may lead to congestion in the systems. The growing use of M2M applications increases the risk of traffic congestion in the systems, especially if, for example, there will be a very large variety of M2M user equipments and an even larger variety of M2M applications that have been programmed for these user equipments by their owners or by the designer of the system to e.g. transmit reports at a certain point in time. For example if all electricity meters in an area attempt to report their readings to a central at one and the same time, and that point in time happens to be at rush hour for other users, for example at 5 o'clock in the afternoon, there will be a problem with congestion and overload of the system. Congestion and overload affects all users of the system, both machines and human users.

SUMMARY

The objective of embodiments herein is therefore to obviate at least one of the above disadvantages and to provide improved congestion control in a cellular communication system.

According to a first aspect, the objective is achieved by a method in a transceiver for permitting access to a cellular communications system. The transceiver is configured to transmit traffic to a communication node. The transceiver receives a permission message from the communication node. The permission message indicates permission to a group of transceivers to transmit an access request message indicating a request to transmit the traffic to the communication node. The transceiver determines whether the transceiver is comprised in the group of transceivers having permission to transmit the access request message based on the received permission message.

According to a second aspect, the objective is achieved by a method in a communication node for permitting access to a cellular communication system. The communication node is configured to receive traffic from a transceiver. The communication node transmits a permission message to the transceiver. The permission message indicates permission to a group of transceivers to transmit an access request message indicating a request to transmit the traffic to the communication node.

According to a third aspect, the objective is achieved by a transceiver for permitting access to a cellular communication system. The transceiver comprises a transmitting unit configured to transmit traffic to a communication node. The transceiver comprises a receiving unit which is configured to receive a permission message from the communication node. The permission message indicates permission to a group of transceivers to transmit an access request message indicating a request to transmit the traffic to the communication node. The transceiver comprises a determining unit configured to determine whether the transceiver is comprised in the group of transceivers having permission to transmit the access request message to the communication node based on the received permission message.

According to a fourth aspect, the objective is achieved by a communication node for permitting access to a cellular communication system. The communication node comprises a receiving unit which is configured to receive traffic from a transceiver. The communication node comprises a transmitting unit configured to transmit a permission message to the transceiver. The permission message indicates permission to a group of transceivers to transmit an access request message indicating a request to transmit the traffic to the communication node.

The embodiments herein afford many advantages, for which a non-exhaustive list of examples follows:

An advantage of the embodiments herein is that congestion caused by MTC traffic in a cellular communications system may be reduced or avoided completely.

Another advantage is that the congestion and overload is controlled without any extra signaling from the transceiver. That is, the transceiver does not need to retransmit its communication requests. By using the received permission messages it knows when the network has free capacity for its communication requests.

A further advantage is that dimensioning of mobile networks becomes easier as traffic may be permitted when the network has available capacity. Hence better network utilization is achieved and some traffic peaks is avoided.

Another advantage is that mobile operators can differentiate their subscriptions and offer lower cost subscriptions for Machine to Machine communication that use transceivers based on the permission scheme and method described herein.

BRIEF DESCRIPTION OF THE DRAWINGS

The embodiments herein will be described in more detail in the following, with reference to the appended drawings, in which.

DETAILED DESCRIPTION

Figure 1:
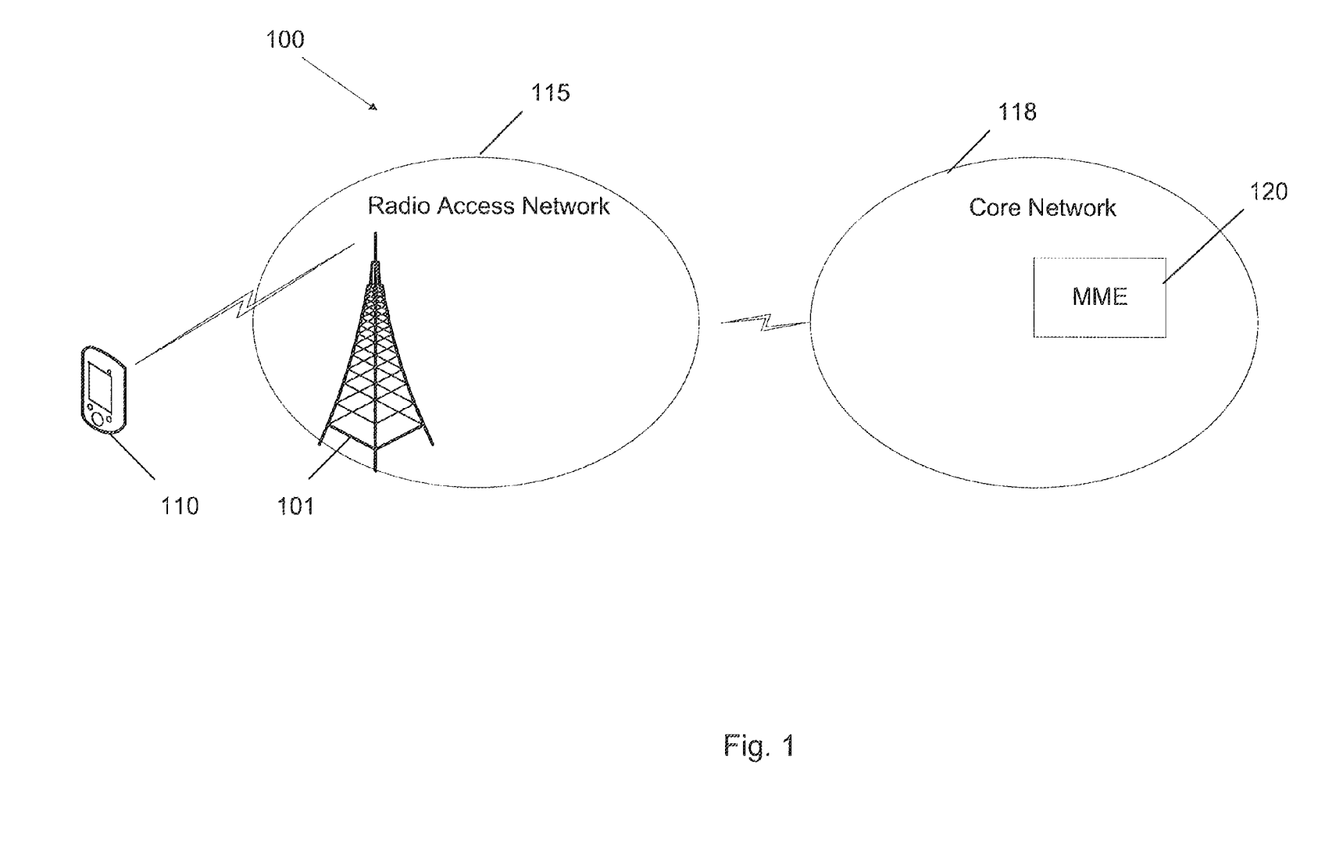
FIG. 1 is a schematic block diagram illustrating embodiments of a cellular communication system.

FIG. 1 shows a schematic view of parts of a cellular communications system 100 in which the embodiments herein are applied. The embodiments herein will be described in the following with terminology from a LTE system, but it should be made clear that this is merely in order to facilitate the reader's understanding of the description, and should be seen as an example only. The invention may equally well be applied in other types of cellular communications systems, such as for example WCDMA systems and GSM systems.

The system 100 shown in FIG. 1 comprises a node. In some embodiments, the node may serve a cell (not shown). The node may be a network unit capable to communicate over a radio carrier with a transceiver. The node may be for example a Base Transceiver Station (BTS), a BSC or a Serving General Packet Radio Service Support Node (SGSN) in a GSM system, a NodeB, a RNC or SGSN in a WCDMA system, an evolved NodeB (eNB) or an Mobility Management Entity (MME) in an LTE system. The node of embodiments herein will from now on be described as being the MME 120, although it can also be the eNodeB 101. The MME 120 will be explained in more detail below.

The transceiver may be a user equipment, for an LTE system, but in other embodiments it may also be a user equipment for a WCDMA system, or a Mobile Station (MS), for a GSM system. In the following description and in the figures, a user equipment 110 is used as an example. The user equipment 110 is present in the cell. Even though FIG. 1 illustrates only one eNB 101 and only one user equipment 110, a person skilled in the art will understand that the system 100 may comprise a plurality of eNBs 101 and a plurality of user equipments 110.

The user equipment 110 may be any suitable communication device or computational device with communication capabilities capable to communicate with a base station over a radio channel, for instance but not limited to mobile phone, smart phone, personal digital assistant (PDA), laptop, MP3 player or portable DVD player (or similar media content devices), digital camera, or even stationary devices such as a PC. A PC may also be connected via a mobile station as the end station of the broadcasted/multicasted media. The user equipment 110 may also be an embedded communication device in e.g. electronic photo frames, cardiac surveillance equipment, intrusion or other surveillance equipment, weather data monitoring systems, car or transport communication equipment, etc. The user equipment 110 is referred to as UE in some of the figures.

The communication system 100 comprises, as mentioned earlier, a radio access network 115 and a core network 118. The radio access network comprises a number of nodes, such as BSC (not shown) and a RNC (not shown). The core network 118 also comprises a plurality of entities, such as for example the MME 120. When a user equipment 110 registers with the core network 118, the MME 120 request subscriber data from a home subscriber server and performs authentication of the user equipment's 110 Subscriber Identity Module (SIM) card. The MME 120 also takes care of signaling to and from the user equipment 110, by means of signaling protocols referred to as Non Access Stratum (NAS) signaling. The MME also takes care of handover signaling when a user equipment 110 moves between two radio access areas or networks.

As mentioned initially, one of the aims of the embodiments herein is to improve the situation with regard to system congestion caused by Machine to Machine applications in cellular communications systems, "M2M" applications for short. The growing use of M2M applications increases the risk of traffic congestion in the systems, especially if, for example, there will be a very large variety of M2M user equipments and an even larger variety of M2M applications that have been programmed for these user equipments by their owners or by the designer of the system to e.g. transmit reports at a certain point in time.

One way of avoiding such congestion is by recognizing the fact that many M2M applications are not time critical. Naturally, an M2M application such as a home alarm system is extremely time critical, while other M2M systems or messages such as, for example, electricity meters which submit their readings, are much less time critical, i.e. they are in other terms "delay tolerant". Delivering greetings to connected electronic photo frames is another example of an M2M application that is not time critical.

One way of reducing the risk of traffic congestion caused by, for example, M2M applications is to let the system 100 allow only certain amounts of users to transmit M2M traffic during a certain period of time, after which another group of users, i.e. user equipments 110, is allowed to transmit M2M traffic.

Figure 2:
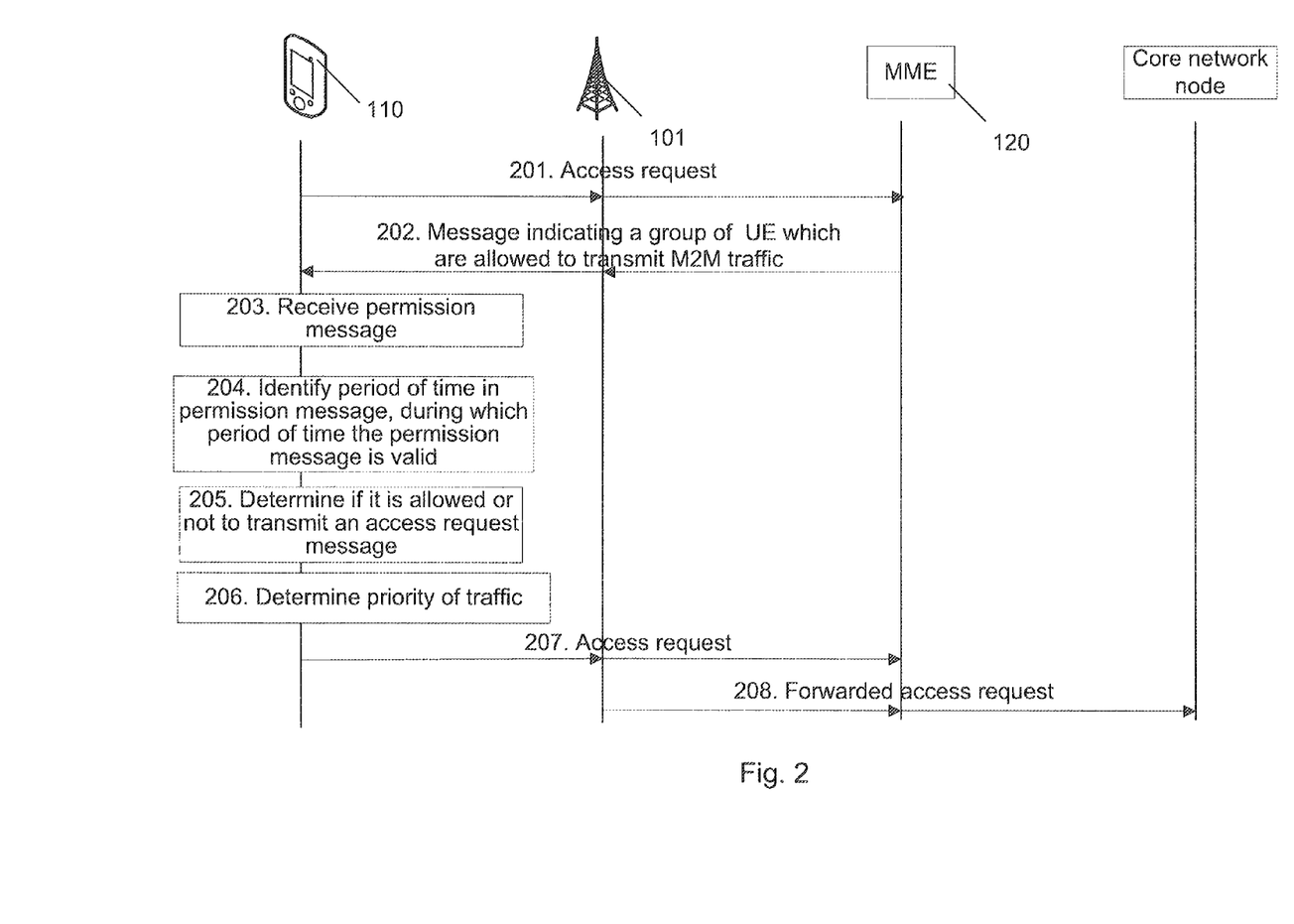
FIG. 2 is a combined signaling diagram and flow chart illustrating embodiments of a method.
Figure 3:
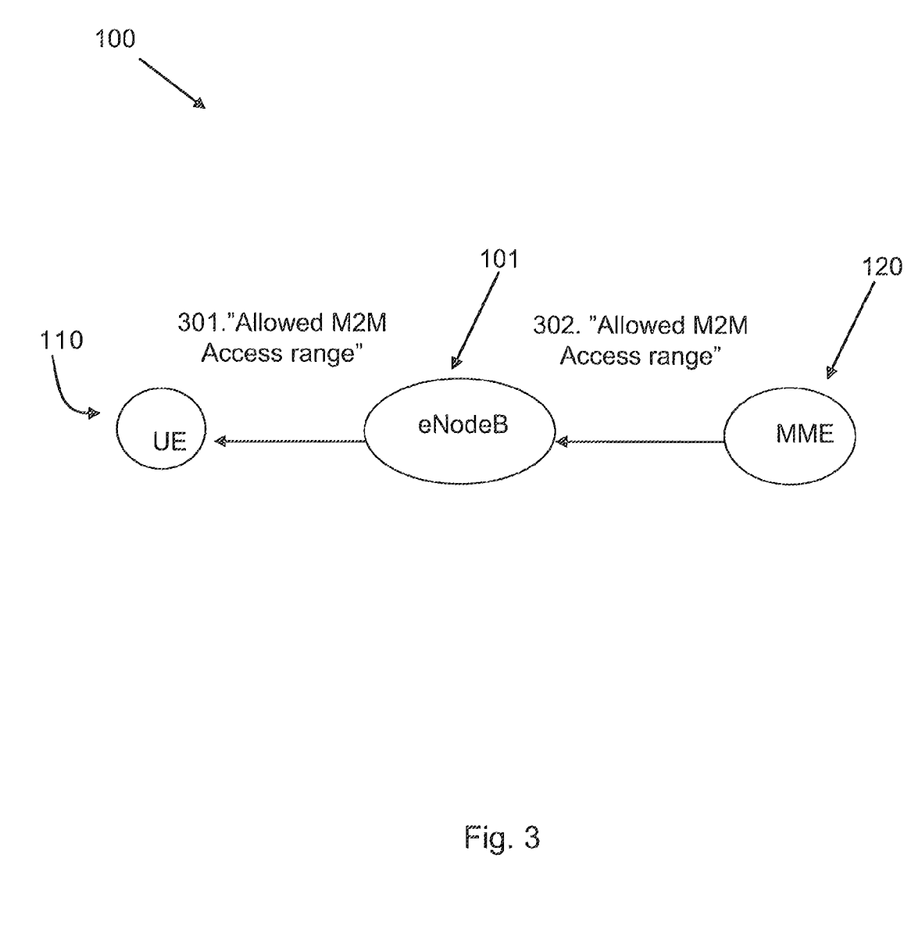
FIG. 3 is a flow chart illustrating embodiments of a method.

The present solution method for permitting access to a cellular communication system 100 according to some embodiments will now be described with reference to the combined signaling diagram and flowchart depicted in FIG. 2 and the flow chart depicted in FIG. 3 illustrating the method, and with reference to FIG. 1 depicting the communication system 100. In FIGS. 2 and 3, the user equipment 110 and the MME 120 are used as examples of which nodes that may participate in the method. However, other nodes may also be applicable, such as for example the eNodeB 101. The method comprises the following steps, which steps may as well be carried out in any suitable order than described below.

Step 201

In some embodiments, the first step of the method is that the user equipment 110 tries to connect to the system 100 by transmitting an access request message to the MME 120 indicating that the user equipment 110 wishes to establish a connection to the system 100. In some embodiments, step 201 is not performed as the first step of the method. The user equipment 110 may transmit the access request message via the eNodeB 101.

In some embodiments, the access request message may be sent periodically to the MME 120.

The access request message indicates a request for transmission of delay tolerant traffic.

Step 202, 301 and 302

In some embodiments, step 202 is performed as a response to the access request message sent in step 201. In some embodiments, where step 201 is not performed, step 202 is performed as the first step of the method.

The MME 120 transmits a message to the user equipment 110, indicating a group or range of users, i.e. user equipments 110, which are allowed to transmit M2M traffic at present. In other words, the MME 120 transmits a permission message. The MME 120 may transmit the message via the eNodeB 101.

In some embodiments, the MME 120 transmits the permission message to a group of user equipments 110 in the system 100 indicating that only a certain sub-group of the group of user equipments 110 is allowed to transmit access request messages to the MME 120.

The message may be seen as a permission message from the MME 120 to the user equipments 110 indicating a group of user equipments which is allowed to transmit access request messages to the MME 120, i.e. messages that indicate that the user equipments 110 need to establish a connection to the system 100 in order to transmit traffic. The group of user equipments may be a sub-group of all user equipments comprised in the cellular communication system 100.

The permission message may sent periodically from the MME 120 to the user equipment 110, upon request, as a response to the access request message in step 201 or when triggered by a trigger (not shown) received from for example the user equipment 110.

In some embodiments, the MME 120 transmits the permission message with a first periodicity and changes the sub-group of user equipments 110 which is allowed to transmit access request messages with a second periodicity. In other words, after for example x seconds a new permission message is transmitted, and suitably the sub-group is changed by the MME 120 with the same periodicity although the two periods may also differ, so that the sub-group is changed every y seconds. Naturally, x and y need not be larger than one, and need not be integers.

In some embodiments, the MME 120 may comprise a validity time in the permission message. The validity time indicates a time during which the sub-group is allowed to transmit access request messages to the MME 120. In this manner, the user equipments 110 which are not included in the sub-group know that they are barred from trying to access the system with M2M delay tolerant traffic during this period of time.

The sub-group which is allowed to access the system with M2M traffic may be chosen by the MME 120 in a large number of ways. The MME 120 may select the sub-group of transceivers based on an identity tied to the use equipments 110 in the system 100, so that the sub-group is identified as a range of such identities. Some examples of way of choosing sub-group will be described below.

In some embodiments, the group of user equipments 110 is based on an identity associated with the user equipments 110 in the system 100, and, as mentioned above, the group is identified by a range of such identities. The identity in question may, for example, be one or more of the following:

The International Mobile Subscriber Identity (IMSI) associated with the user equipment 110.

A telephone number, i.e. Mobile Station International Subscriber Directory Number (MSISDN), associated with the user equipment 110.

The International Mobile Equipment Identity (IMEI), electric serial number, Mobile Equipment Identifier (MEID), etc. associated with the user equipment 110.

For example, the range may be the three, or more, or less, last/first/middle digits in the IMSI number, and the range may then be expressed as, for example, 1-100, 1-10, 1-1000, 50-100, etc. If the size of the range is known, the starting digit may for example be generated randomly by the MME 120.

In order to take into account the fact that the risk of traffic congestion usually varies during the day, the MME 120 may suitably vary the size of the range, i.e. the size of the sub-group, according to at least one of the following:

The time of day when the permission message is received,

The current congestion situation in the system 100.

Returning to FIGS. 2 and 3.

Step 203

The user equipment 110 receives the permission message from the MME 120 indicating which user equipment(s) 110 that are allowed to transmit access request messages. In some embodiments, the permission message is sent from the MME 120 via the eNodeB 101 to the user equipment 110.

In some embodiments, a group or subgroup of user equipments 110 receive the permission message.

In some embodiments, the permission message is forwarded or sent by the eNodeB 101 as a broadcast message in the cells it supports. For example in the system information that is broadcasted regularly by each eNodeB 101.

Step 204

In some embodiments, the user equipment 110 identifies a period of time in the permission message, during which period of time the permission message is valid, and uses this period.

Step 205

The user equipment 110 use the received permission message to determine if it is allowed or not to transmit an access request message to the MME 120.

Step 206

The user equipment 110 determines the priority of the traffic for which the access request message is sent. The traffic may have for example low or high priority.

The user equipment 110 only uses the permission message for certain kinds of traffic which have been determined to be of a lower priority, so that access request messages are sent for traffic from the user equipment 110 which has not been determined to be of a lower priority, regardless of the permission message. For example, if M2M traffic has been classed as delay tolerant, the user equipment 110 will obey the permission message for such traffic, while ignoring it for other kinds of traffic, such as, for example alarm messages.

Step 207

The user equipment 110 tries to connect to the system 100 by transmitting the access request message indicating that the user equipment 110 wishes such a connection.

In some embodiments, the user equipment 110 may transmit the access request message periodically.

In some embodiments, the access request message is transmitted at a random point in time from the point in time when the permission has been received.

In some embodiments, if an access request message was sent in step 201, the access request message in step 207 is the second access request message sent. However, the first access request message in step 201 was then not received in step 201.

In order to further avoid congestion, the user equipment 110 transmits access request messages for traffic of lower priority, such as M2M traffic, when permission for this has been received, at a random point in time from the point in time when the permission has been received.

Step 208 and 302

In some embodiments, the node, i.e. the eNodeB 101 or the MME 120, forwards the access priority that an admitted or permitted use equipment 110 has used to an appropriate core network node that records connection information for charging purposes. Such a core network node may be the MME, Packet Data Network (PDN) Gateway, Serving Gateway, SGSN, or Gateway General Packet Radio Service Support Node (GGSN). The core network node may be the MME, PDN Gateway, Serving Gateway, SGSN, or GGSN when the node is the eNodeB 101. The core network node may be PDN Gateway, Serving Gateway, SGSN, or GGSN when the node is the MME 120. The responsible operator using this method may want to take special actions for customers having user equipments 110 not obeying negotiated agreements.

The method described above will now be described seen from the perspective of a transceiver 110. FIG. 3 is a flowchart describing the present method in the transceiver 110 for permitting access to a cellular communications system 100. The transceiver 110 is configured to transmit traffic to a communication node 101,120. In some embodiments, the transceiver 110 is a user equipment or a mobile station, and the communication node 101, 120 is a evolved Node B or a mobility management entity.

In some embodiments, each transceiver comprised in the cellular communication system 100 is associated with an identity, and wherein the group of transceivers is associated with a range of identifiers. In some embodiments, the identity is based on at least one of an international mobile subscriber identity, international mobile equipment identity and a telephone number. In some embodiments, each transceiver has a configured group identity used for the purposes of the permission control. In some embodiments, a size of the range of permitted identifiers is based on a time when the permission message is received and a traffic congestion situation in the cellular communication system 100. In some embodiments the traffic is machine to machine traffic.

In some embodiments, the transceiver 110 is a user equipment or a mobile station and the communication node 101, 120 is a UTRAN Node B or a Serving GPRS Support Node, referred to as SGSN, or wherein the transceiver 110 is a user equipment or a mobile station and the communication node 101, 120 is a GERAN base station controller, referred to as BSC or a Serving GPRS Support Node, referred to as SGSN.

The method comprises the steps to be performed by the transceiver 110:

Step 401

Figure 4:
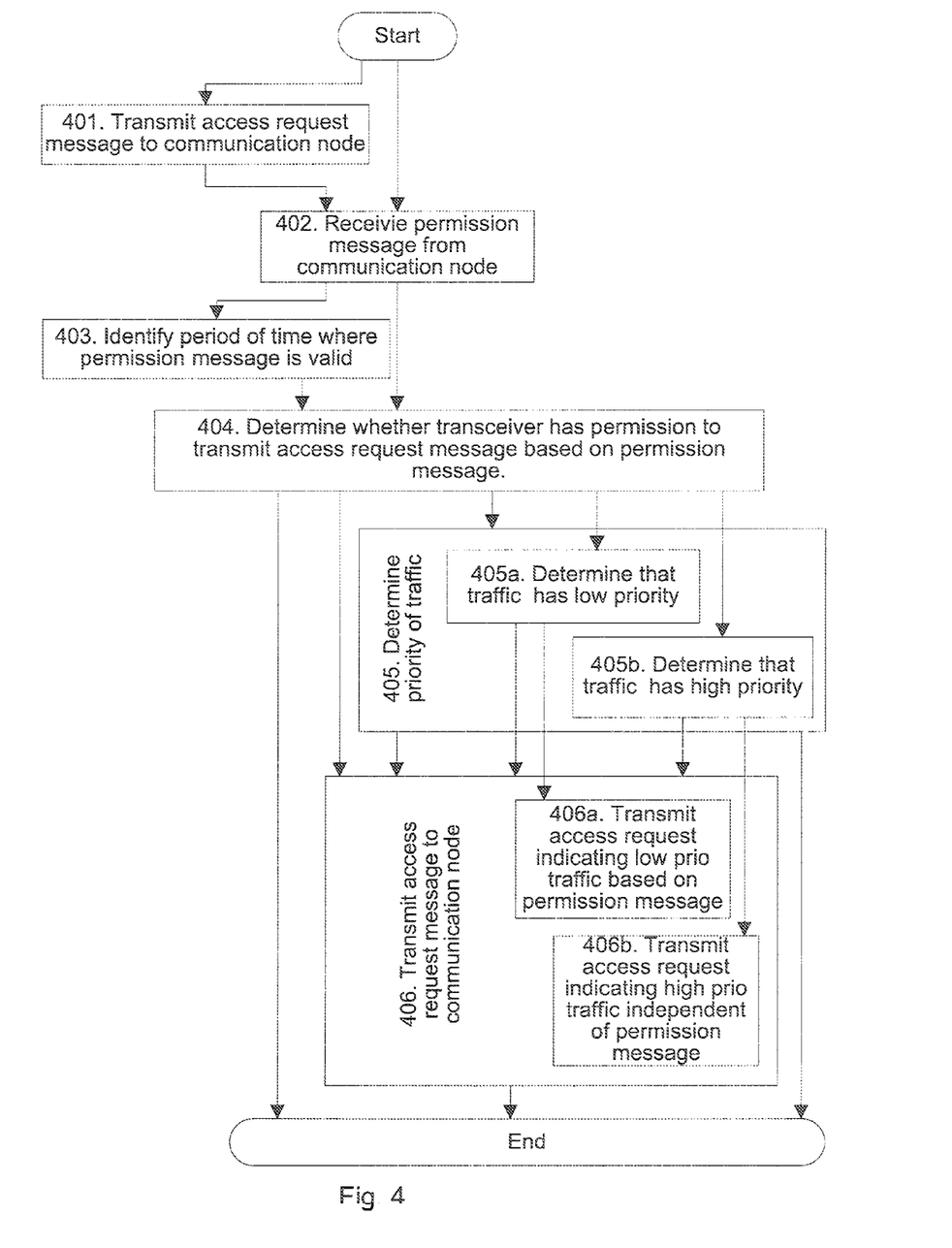
FIG. 4 is a flow chart illustrating embodiments of a method in a transceiver.

This step corresponds to step 201 in FIG. 2.

In some embodiments, the transceiver 110 transmits the access request message to the communication node 101, 120.

Step 402

This step corresponds to step 202 in FIG. 2.

The transceiver 110 receives a permission message from the communication node 101,120. The permission message indicates permission to a group of transceivers to transmit an access request message indicating a request to transmit the traffic to the communication node 101, 120.

In some embodiments, the permission message comprises a validity time during which the transceiver is permitted to transmit access request messages.

Step 403

This step corresponds to step 204 in FIG. 2.

In some embodiments, the transceiver 110 identifies a period of time in the permission message, during which period of time the permission message is valid.

Step 404

This step corresponds to step 205 in FIG. 2.

The transceiver 110 determines whether the transceiver 110 is comprised in the group of transceivers having permission to transmit the access request message based on the received permission message.

Step 405

This step corresponds to step 206 in FIG. 2.

In some embodiments, the transceiver 110 determines a priority of the traffic.

Step 405a

This step corresponds to step 206 in FIG. 2.

This is a substep of step 405. In some embodiments, the transceiver determines that the traffic to the communication node 101, 120 has low priority, in other words the transceiver is a delay tolerant device.

Step 405b

This step corresponds to step 206 in FIG. 2.

This is a substep of step 405, and an alternative to step 405a. In some embodiments, the transceiver determines that the traffic to the communication node 101, 120 has high priority Step 406

This step corresponds to step 207 in FIG. 2.

In some embodiments, the transceiver 110 transmits the access request message to the communication node 101, 120.

In some embodiments, the permission message is received before the access request message is transmitted.

Step 406a

This step corresponds to step 207 in FIG. 2.

This is a substep of step 406, and a step to be performed after substep 405a. In some embodiments, the transceiver transmits the access request message indicating request to transmit low priority traffic to the communication node 101, 120 based on the received permission message.

Step 406b

This step corresponds to step 207 in FIG. 2.

This is a substep of step 406, and a step to be performed after substep 405a, and as an alternative to step 406a. In some embodiments, the transceiver transmits the access request message indicating a request to transmit high priority traffic to the communication node 101, 120 independent of the received permission message.

Figure 5:
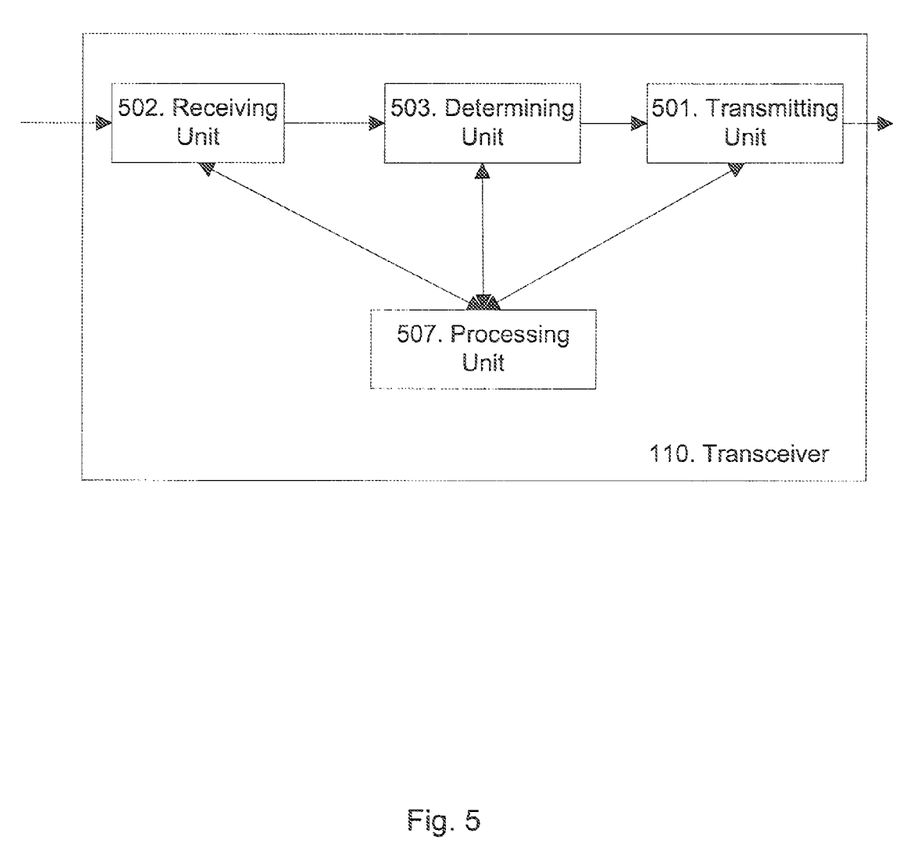
FIG. 5 is a block diagram illustrating embodiments of a transceiver.

To perform the method steps shown in FIG. 4 for permitting access to a cellular communication system 100 the transceiver 110 comprises a transceiver arrangement as shown in FIG. 5.

The transceiver 110 comprises a transmitting unit 501 configured to transmit traffic to a communication node 101,120.

In some embodiments, the transceiver 110 is a user equipment or a mobile station, and the communication node 101, 120 is an evolved Node B or a mobility management entity.

The transceiver 110 comprises a receiving unit 502 configured to receive a permission message from the communication node 101,120. The permission message indicates permission to a group of transceivers to transmit an access request message indicating a request to transmit the traffic to the communication node 101, 120. In some embodiments, the permission message comprises a validity time during which the transceiver 110 is permitted to transmit access request messages. In some embodiments, the permission message is received before the access request message is transmitted. In some embodiments, the permission message is received as a broadcast message in the current cell of the transceiver 110. For example in the system information that is broadcasted regularly in the cell by the eNodeB 101.

The transceiver 110 further comprises a determining unit 503 configured to determine whether the transceiver 110 is comprised in the group of transceivers having permission to transmit the access request message based on the received permission message. In some embodiments, the determining unit 503 is further configured to determine a priority of the traffic. The determining unit 503 may be configured to determine that the traffic to the communication node 101, 120 has low priority, in other words the transceiver 110 is a delay tolerant device. In some embodiments, the determining unit 503 is configured to determine that the traffic to the communication node 101, 120 has high priority In some embodiments, the transmitting unit 501 is further configured to transmit the access request message to the communication node 101, 120. In some embodiments, the transmitting unit 505 is further configured to transmit the access request message indicating request to transmit low priority traffic to the communication node 101, 120 based on the received permission message. In some embodiments, the transmitting unit 505 is configured to transmit the access request message indicating a request to transmit high priority traffic to the communication node 101, 120 independent of the received permission message.

In some embodiments, the transceiver 110 further comprises a processing unit 507 configured to identifies a period of time in the permission message, during which period of time the permission message is valid. In some embodiments, the processing unit 507 is further configured to identify a period of time in the permission message, during which period of time the permission message is valid.

Figure 6:
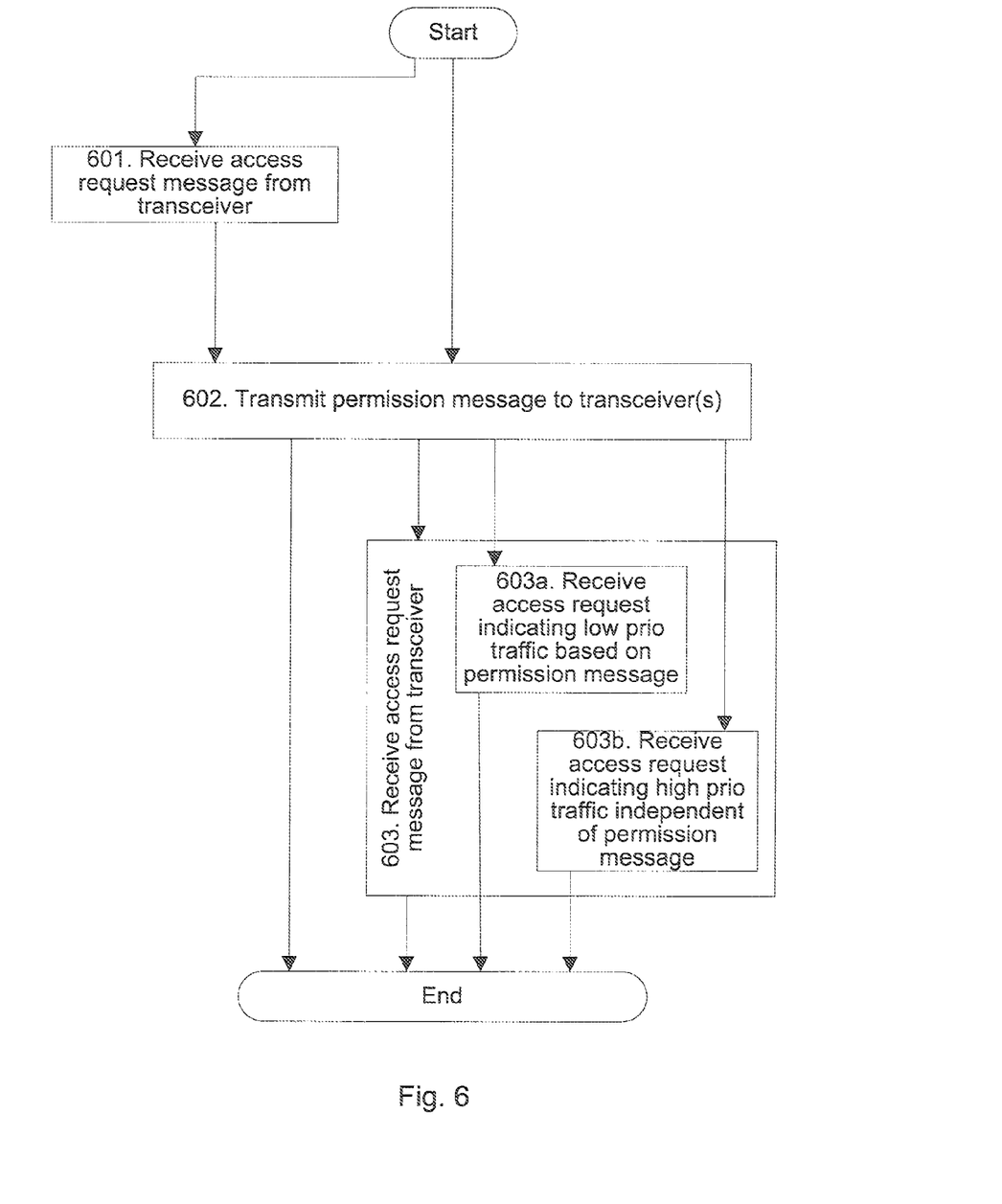
FIG. 6 is a flow chart illustrating embodiments of a method in a communication node.

The method described above will now be described seen from the perspective of a communication node 101, 120. FIG. 6 is a flowchart describing the present method in the communication node 101, 120 for permitting access to a cellular communication system 100. The communication node 101, 120 is configured to receive traffic from a transceiver 110. In some embodiments, the transceiver 110 is a user equipment or a mobile station, and the communication node 101, 120 is an evolved Node B or a mobility management entity. The method comprises the steps to be performed by the communication node 101, 120:

Step 601

This step corresponds to step 201 in FIG. 2.

In some embodiments, the communication node 101,120 receives an access request message from the transceiver 110.

Step 602

This step corresponds to step 202 in FIG. 2.

The communication node 101, 120 transmits a permission message to the transceiver 110. The permission message indicates permission to a group of transceivers to transmit the access request message indicating a request to transmit the traffic to the communication node 101, 120.

In some embodiments, the permission message is received before the access request message is transmitted.

In some embodiments, the permission message comprises a validity time during which the transceiver is permitted to transmit access request messages.

In some embodiments, each transceiver comprised in the cellular communication system 100 is associated with an identity, and wherein the group of transceivers is associated with a range of identifiers. In some embodiments, the identity is based on at least one of an international mobile subscriber identity, international mobile equipment identity and a telephone number (MSISDN). In some embodiments, each transceiver has a configured group identity used for the purposes of the permission control.

In some embodiments, a size of the range of identifiers is based on a time when the permission message is received and a traffic congestion situation in the cellular communication system 100.

In some embodiments, the traffic is machine to machine traffic.

Step 603

This step corresponds to step 207 in FIG. 2.

In some embodiments, the communication node 101,120 receives the access request message from the transceiver 110.

Step 603a

This step corresponds to step 207 in FIG. 2.

In some embodiments, the communication node 101,120 receives the access request message from the transceiver 110 indicating request to transmit low priority traffic to the communication node 101, 120 based on the received permission message.

Step 603b

This step corresponds to step 207 in FIG. 2.

In some embodiments, the communication node 101,120 receives the access request message from the transceiver 110 indicating a request to transmit high priority traffic to the communication node 101, 120 independent of the received permission message.

Figure 7:
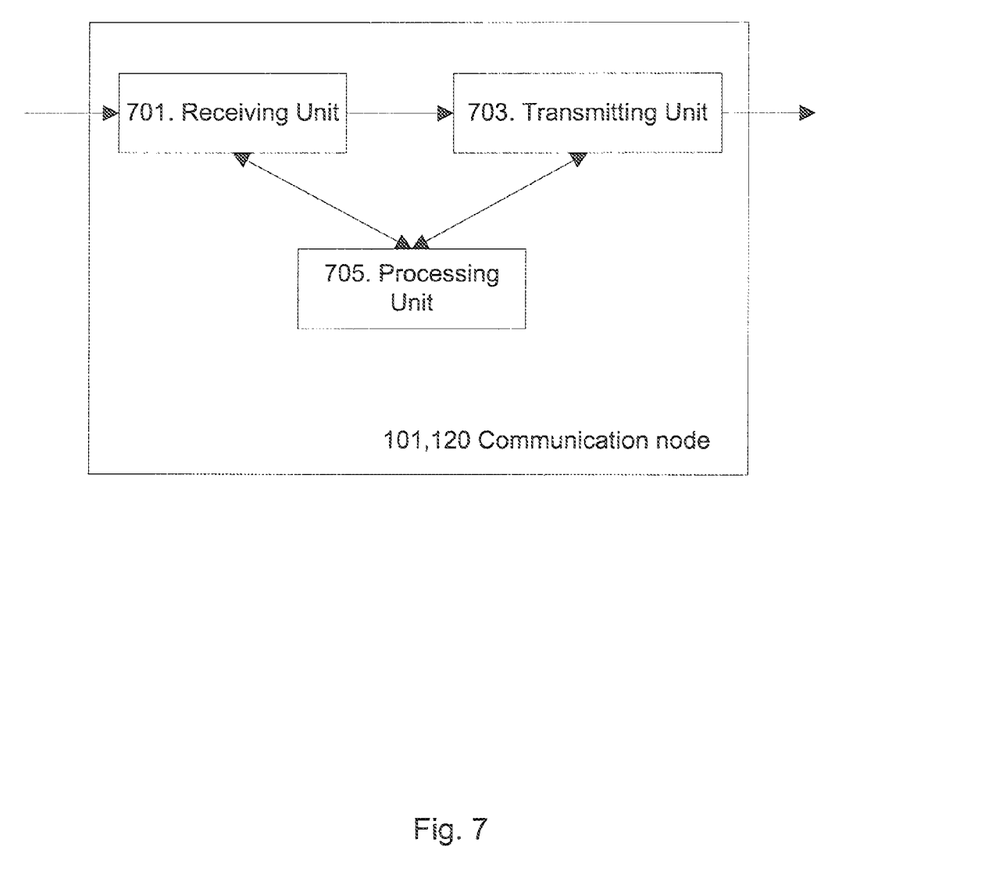
FIG. 7 is a block diagram illustrating embodiments of a communication node.

To perform the method steps shown in FIG. 6 for permitting access to a cellular communication system 100 the communication node 101, 120 comprises a communication node arrangement as shown in FIG. 7. The communication node 101,120 comprises a receiving unit 701 which is configured to receive traffic from a transceiver 110. The communication node 101, 120 comprises a transmitting unit 703 configured to transmit a permission message to the transceiver 110. The permission message indicates permission to a group of transceivers to transmit an access request message indicating a request to transmit the traffic to the communication node 101, 120. In some embodiments, the transmitting unit 703 is further configured to transmit the permission message is before the access request message is received. In some embodiments, the permission message comprises a validity time during which the transceiver is permitted to transmit access request messages. In some embodiments, each transceiver comprised in the cellular communication system 100 is associated with an identity, and wherein the group of transceivers is associated with a range of identifiers. In some embodiments, the identity is based on at least one of an international mobile subscriber identity, international mobile equipment identity, a telephone number or an in the transceiver configured group identity. In some embodiments, a size of the range of identifiers is based on a time when the permission message is received and a traffic congestion situation in the cellular communication system 100.

In some embodiments, the traffic is machine to machine traffic.

In some embodiments, the receiving unit 701 is further configured to receive an access request message from the transceiver 110. In some embodiments, the receiving unit 701 is configured to receive the access request message from the transceiver 110 indicating request to transmit low priority traffic to the communication node 101, 120 based on the received permission message. In some embodiments, the receiving unit 701 is configured to receive the access request message from the transceiver 110 indicating a request to transmit high priority traffic to the communication node 101, 120 independent of the received permission message.

The present mechanism for permitting access to a cellular communication system 100 may be implemented through one or more processors, such as a processor 507 in the transceiver arrangement depicted in FIG. 5 and a processor 705 in the communication node arrangement depicted in FIG. 7, together with computer program code for performing the functions of the present solution. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the present solution when being loaded into the communication node 101, 120. One such carrier may be in the form of a CD ROM disc. It is however feasible with other data carriers such as a memory stick. The computer program code can furthermore be provided as pure program code on a server and downloaded to the communication node 101, 120 remotely.

The embodiments herein are not limited to the examples of embodiments described above and shown in the drawings, but may be freely varied within the scope of the appended claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

The invention claimed is:

1. A method in a transceiver for permitting access to a cellular communications system, the transceiver is configured to transmit machine to machine traffic to a communication node, the method comprising:

receiving a permission message from the communication node, said permission message indicates permission to a group of transceivers to transmit an access request message, said message indicating a request to transmit the machine to machine traffic to the communication node, and wherein the permission message is based on a current congestion situation in the cellular communications system; and determining whether the transceiver is comprised in the group of transceivers having permission to transmit the access request message based on the received permission message, wherein each transceiver in the cellular communications system is associated with an identity and the group of transceivers is associated with a range of transceiver identifiers, and wherein the permission message indicates the range of transceiver identifiers by establishing a start number and end number such that a number between the start number and the end number identifies a transceiver included in the group of transceivers, the number corresponding to the digits comprised within a predetermined portion of a transceiver identifier and the predetermined portion comprising fewer digits than the transceiver identifier.

2. The method according to claim 1, further comprising: transmitting the access request message to the communication node.

3. The method according to claim 1, further comprising: determining a priority of the machine to machine traffic.

4. The method according to claim 3, wherein the determining a priority of the machine to machine traffic further comprising:

determining that the machine to machine traffic to the communication node has low priority; and wherein the method further comprising:

transmitting the access request message indicating request to transmit low priority machine to machine traffic to the communication node based on the received permission message.

5. The method according to the claim 3, wherein the determining a priority of the machine to machine traffic further comprising:

determining that the machine to machine traffic to the communication node has high priority; and wherein the method further comprising:

transmitting the access request message indicating a request to transmit high priority machine to machine traffic to the communication node independent of the received permission message.

6. The method according to claim 1, further comprising: identifying a period of time in the permission message, during which period of time the permission message is valid.

7. The method according to claim 1, wherein the transceiver is a user equipment or a mobile station, and wherein the communication node is a evolved Node B, referred to as eNodeB, or a mobility management entity, referred to as MME.

8. The method according to claim 1, wherein the transceiver is a user equipment or a mobile station and the communication node is a UTRAN Node B or a Serving GPRS Support Node, referred to as SGSN, or wherein the transceiver is a user equipment or a mobile station and the communication node is a GERAN base station controller, referred to as BSC or a Serving GPRS Support Node, referred to as SGSN.

9. The method according to any of the claim 1, wherein the permission message is received before the access request message is transmitted.

10. The method according to claim 1, wherein the permission message comprises a validity time during which the transceiver is permitted to transmit access request messages.

11. The method according to claim 1, wherein the identity is based on at least one of an international mobile subscriber identity, an international mobile equipment identity, a telephone number or an in the transceiver configured group identity.

12. A method in a communication node for permitting access to a cellular communication system, the communication node is configured to receive machine to machine traffic from a transceiver, the method comprising:

transmitting a permission message to the transceiver, said permission message indicates permission to a group of transceivers to transmit an access request message, said message indicating a request to transmit the machine to machine traffic to the communication node, wherein the permission to transmit the access request message is based on available capacity in the cellular communications system, wherein each transceiver in the cellular communications system is associated with an identity and the group of transceivers is associated with a range of transceiver identifiers, and wherein the permission message indicates the range of transceiver identifiers by establishing a start number and end number such that a number between the start number and the end number identifies a transceiver included in the group of transceivers, the number corresponding to the digits comprised within a predetermined portion of a transceiver identifier and the predetermined portion comprising fewer digits than the transceiver identifier.

13. A transceiver for permitting access to a cellular communication system, the transceiver comprising:

a transmitting unit configured to transmit machine to machine traffic to a communication node;

a receiving unit configured to receive a permission message from the communication node, said permission message indicates permission to a group of transceivers to transmit an access request message, said message indicating a request to transmit the machine to machine traffic to the communication node, and wherein the permission to transmit the access request message is based on available capacity in the cellular communications system; and a determining unit configured to determine whether the transceiver is comprised in the group of transceivers having permission to transmit the access request message to the communication node based on the received permission message, wherein each transceiver in the cellular communication system is associated with an identity and the group of transceivers is associated with a range of transceiver identifiers, wherein the permission message indicates the range of transceiver identifiers by establishing a start number and end number such that a number between the start number and the end number identifies a transceiver included in the group of transceivers, the number corresponding to the digits comprised within a predetermined portion of a transceiver identifier and the predetermined portion comprising fewer digits than the transceiver identifier.

14. A communication node for permitting access to a cellular communication system, the communication node comprising:

a receiving unit configured to receive machine to machine traffic from a transceiver; and a transmitting unit configured to transmit a permission message to the transceiver, said permission message indicates permission to a group of transceivers to transmit an access request message, said message indicating a request to transmit the machine to machine traffic to the communication node, wherein the permission to transmit the access request message is based on available capacity in the cellular communications system, wherein each transceiver in the cellular communication system is associated with an identity, and the group of transceivers is associated with a range of transceiver identifiers, and wherein the permission message indicates the range of transceiver identifiers by establishing a start number and end number such that a number between the start number and the end number identifies a transceiver included in the group of transceivers, the number corresponding to the digits comprised within a predetermined portion of a transceiver identifier and the predetermined portion comprising fewer digits than the transceiver identifier.

* * * * *

UNITED STATES PATENT AND TRADEMARK OFFICE
CERTIFICATE OF CORRECTION

PATENT NO. : 8,554,216 B2  
APPLICATION NO. : 12/981666  
DATED : October 8, 2013  
INVENTOR(S) : Ronneke et al.

Page 1 of 1

It is certified that error appears in the above-identified patent and that said Letters Patent is hereby corrected as shown below:

In the Specification

In Column 6, Line 16, delete "use" and insert -- user --, therefor.

In Column 7, Line 36, delete "use" and insert -- user --, therefor.

In Column 7, Line 55, delete "a evolved" and insert -- an evolved --, therefor.

In the Claims

In Column 12, Line 57, in Claim 7, delete "a evolved" and insert -- an evolved --, therefor.

In Column 13, Line 1, in Claim 9, delete "to any of the claim" and insert -- to claim --, therefor.

Signed and Sealed this  
Fifteenth Day of July, 2014

Michelle K. Lee  
*Deputy Director of the United States Patent and Trademark Office*